C. COLAHAN.
Harvester.
No. 8,290. Reissued June 18, 1878.
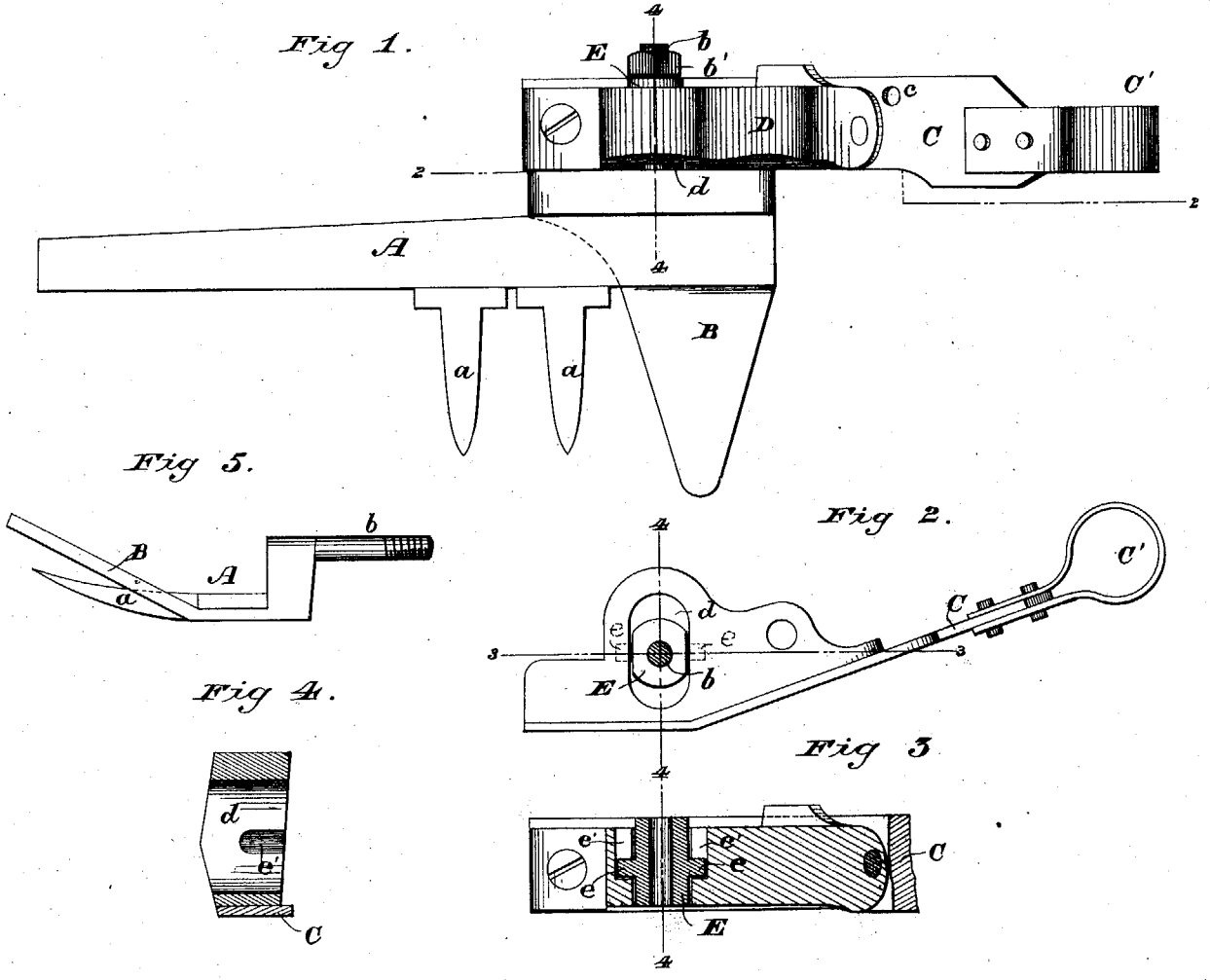
WITNESSES
Wm A Skinkle
Roberdeau Buchanan.
INVENTOR
Charles Colahan
By his Attorneys
Baldwin Hopkins & Peyton
N. PETERS, PHOTO-LITHOGRAPHER, WASHINGTON, D. C.

UNITED STATES PATENT OFFICE.

CHARLES COLAHAN, OF CLEVELAND, OHIO.

IMPROVEMENT IN HARVESTERS.

Specification forming part of Letters Patent No. 140,890, dated July 15, 1873; Reissue No. 8,290, dated June 18, 1878; application filed May 24, 1878.

*To all whom it may concern:*

Be it known that I, CHARLES COLAHAN, of Cleveland, in the county of Cuyahoga and State of Ohio, have invented certain new and useful Improvements in Mowing-Machines, of which the following is a full, clear, and exact description.

Prior to the date of my invention it was customary to hinge the shoe and inner or heel end of the cutter-bar or finger-beam of a mowing-machine to a head connected with a brace, drag-bar, coupling-arm, or coupling-frame (in turn hinged to the main frame or axle) in such manner that the outer or divider end of this cutter-bar or finger-beam could be raised or lowered, if desired, relatively to the point at which its inner end was hinged to the head.

It is likewise desirable, in addition to this rising-and-falling movement of the finger-beam, so to connect it and its inner shoe with the head or coupling-frame that they can rock or roll on the longitudinal axis of the finger-beam, or in a line substantially parallel therewith, so as to be capable of being adjusted at various angles, and thus enable the shoe and guards to clear obstructions, or to run at varying heights above the ground.

This rocking or rolling movement of the shoe-guards and finger-beam has heretofore been attained in various ways—for instance, by a ball-and-socket joint; by connecting the shoe to the hinged coupling-frame by two joints or hinges at right angles to each other; by making a slot in the shoe, through which the coupling-arm or drag-bar passed; or by making the front end of a shoe (hinged at its rear end to a drag-bar) slide or move up and down in a slotted guide on the drag-bar or coupling-frame, all of which plans are more or less complicated and expensive, comparatively speaking, and involve practical difficulties well known to manufacturers of mowing-machines.

The object of my invention is to simplify the devices hereinbefore referred to as used for the purposes mentioned, and so to connect the cutter-bar or finger-beam, shoe, and guards to its head by means of a single joint, simple in its construction, that by the use of this single joint the outer end of the bar can be elevated and the angle of the guards be adjusted, or the rocking and rolling movement hereinbefore referred to be attained.

To attain the object of my invention, the head to which the finger-beam, guards, and shoe are hinged is provided with a hole, so formed that when a pin or connecting-bolt, which connects the finger-beam, shoe, and head, is suitably secured in such hole, one end of the pin will be free to move up and down sufficiently to give the required rocking or rolling movement, or permit the adjustment of the shoe and guards to the desired angle, while at the same time the outer end of the finger-beam can be elevated, as in the other methods of hinging hereinbefore referred to. By this means I am enabled to connect the finger-beam and shoe to the coupling-frame by means of what I call a "two-way joint," simple in construction and well adapted to attain the result desired.

The subject-matter claimed hereinafter specifically will be designated.

In the accompanying drawings, which show one way of applying my invention, such parts only of the machine are represented as are necessary to illustrate the subject-matter herein claimed, the wheels, frame, gearing, and other appurtenances being omitted.

Figure 1 represents a plan or top view of a finger-beam coupling embodying my improvements; Fig. 2, a front elevation, partly in section, on the line 2 2 of Fig. 1, of the coupling-frame and rocking sleeve. Fig. 3 represents a horizontal longitudinal section through the head and rocking sleeve on the line 3 3 of Fig. 2. Fig. 4 represents a vertical transverse section through the head on the line 4 4 of Figs. 1, 2, and 3; Fig. 5, an end view of the cutter-bar and sleeve.

The parts hereinafter referred to, being of usual and well-known construction, unless otherwise referred to, need not here be described in detail.

A cutter-bar or finger-beam, A, is provided with guards *a*, as usual, and with a shoe, B, at its inner or heel end. A connecting bolt or pin, *b*, projects backward from the shoe, its rear end being provided with a screw to secure the finger-beam and shoe to the head D, which latter may be connected with the main frame of the machine in any suitable well-known way. As shown in the drawings, this connection is formed by means of a transverse brace, coupling-arm, or frame, C, provided with an eye, C′, at its upper end, adapted to turn on a suitable journal or stud on the main frame.

A steadying-brace or thrust-bar of the usual description can be connected with the coupling-arm, if desired, to give additional firmness or ability to resist transverse strain, a hole, C′, being made in the coupling-arm for the connection of this brace.

A vertically oblong or oval hole or slot, *d*, in the head receives a tubular rocking bearing or sleeve, E, provided with trunnions *e* resting in slots or recesses *e′* in the head, the rocking sleeve being made smaller vertically than the hole within which it rocks on its lugs. This rocking bearing or sleeve is made tubular to form a bearing for the connecting bolt or pin *b*, above mentioned, which is secured in place by a nut, *b′*, which screws on the rear end of said pin, the stud projecting back of the head for that purpose.

With the above-described organization of parts the finger-beam and shoe are pivoted to the head by a connecting bolt or pin passing through the rocking sleeve or bearing, and the outer or divider end of the finger-beam can be elevated by means of levers in the usual manner, while at the same time the finger-beam has the desired rocking movement parallel with its longitudinal axis.

If desired, the shoe and guards could be adjusted and set at any given angle, and still be free to move upward when passing over obstructions, by employing a set-screw or other suitable devices at the rear of the rocking bearing or sleeve.

The rocking bearing above described might be omitted, and the rocking and rolling movements above mentioned still be attained by making the hole in the head round, or substantially so at its front, and only large enough to receive the connecting bolt or pin *b* easily, and allow a little play thereof, at the same time gradually increasing the size of this hole, or flaring it vertically backward as it passes through the head, thus making the hole vertically oblong or oval, except at the front.

I have described the hole *d* as vertically oblong or oval, and prefer that form; but it need not have this specific shape, as it is only essential that the hole be so enlarged and formed that the connecting bolt or pin *b*, when secured therein properly, can have the double rocking and rolling movement hereinbefore mentioned.

The distinguishing characteristics and advantages of my improved organization are, that the connection with the head of the shoe and finger-beam is from the rear, thus leaving the front of the shoe free and unobstructed; that both the shoe and finger-beam rock together without necessarily rocking the head; and that the slotted head and connecting-bolt form a free joint, which permits the finger-beam to rise and fall at its outer end, and also to rock and roll in the line of its length.

I claim as of my own invention—

1. A head, substantially such as hereinbefore set forth, having a vertical oblong or oval slot therein for the reception of a connecting bolt or pin uniting the head with the shoe and finger-beam, whereby the shoe, finger-beam, and guards may rock or roll without rocking or rolling the head.

2. A coupling-frame, substantially such as hereinbefore set forth, having at one end a device for connecting it to the frame of the machine, and at the other a head having a vertical oblong or oval slot for the reception of a connecting bolt or pin uniting the head with the finger-beam and shoe, the pin being adapted to play freely in the slot in the head to allow the shoe and finger-beam to rock or roll without rocking or rolling the head or coupling-frame.

3. A connecting bolt or pin rocking and turning in a head provided with a vertical oblong or oval slot, and constituting a double-hinged connection between the head and shoe, whereby the latter rocks or rolls with the pin in or upon the head, substantially as hereinbefore set forth.

4. The combination, substantially as hereinbefore set forth, of a head having a vertical oblong or oval slot therein, a finger-beam, a shoe on the inner or heel end thereof, and a coupling bolt or pin connecting the finger-beam and shoe, and turning and rocking or rolling in the slot, to allow the finger-beam to rock or roll in the line of its length, and also to rise and fall at its divider end without correspondingly affecting the head.

5. The combination, substantially as hereinbefore set forth, of a pivoted coupling-frame, its vertically-slotted head, a rocking bearing therein, a finger-beam, a shoe, and a connecting bolt or pin rocking and turning in the slot, to allow the finger-beam and shoe to rock or roll (without correspondingly affecting the head) to raise or lower the points of the guards.

CHAS. COLAHAN.

Witnesses:

ARTHUR RYERSON,
WALTER C. LARNED.